United States Patent [19]

Allen et al.

[11] Patent Number: 4,978,476
[45] Date of Patent: Dec. 18, 1990

[54] SIDE CHAIN POLYMERS EXHIBITING NONLINEAR OPTICAL RESPONSE

[75] Inventors: Diane E. Allen, Springfield; Ronald N. DeMartino, Wayne, both of N.J.

[73] Assignee: Hoechst Celanese Corp., Somerville, N.J.

[21] Appl. No.: 504,193

[22] Filed: Apr. 2, 1990

[51] Int. Cl.$^5$ ............... F21V 9/04; C09K 19/52; C07D 277/60; C07D 327/10

[52] U.S. Cl. ............... 252/299.01; 252/582; 252/299.01; 428/1; 526/328.5; 526/329.7; 526/328; 548/152; 548/178; 548/346; 549/32

[58] Field of Search ............ 252/299.01, 582, 587; 428/1; 526/328.5, 329.7, 328; 548/152, 178, 346; 549/32

[56] References Cited

U.S. PATENT DOCUMENTS

| | | | |
|---|---|---|---|
| 4,523,008 | 6/1985 | Vogl et al. | 526/328 X |
| 4,808,332 | 2/1989 | DeMartino et al. | 252/299.01 X |
| 4,867,538 | 9/1989 | Yoon et al. | 350/350 R |

FOREIGN PATENT DOCUMENTS 3707835 9/1987 Fed. Rep. of Germany ...... 252/587

OTHER PUBLICATIONS

Nonlinear Optics: Materials and Devices, C. Flyteanis et al., Eds., Springer-Verlag, Berlin 1986.
Wendorff, J. et al., Mol. Cryst. Liq. Cryst. 169,133, 1989.
Wolfe, J. F. S.P.I.E., vol. 682, 70, 1986.
Stamatoff, J. B. et al., S.P.I.E., vol. 682, 85, 1986.
Zyss, J., J. Mol. Electronics, 1, 25–45, 1985.
Nonlinear Optical Properties of Polymers; MRS Symposium Proceedings, vol. 109, Pittsburgh, Pa., 1987.
LeBarny, P. et al., S.P.I.E., vol. 682, 56, 1986.
Griffin, A. C. et al, S.P.I.E., vol. 682, 65, 1986.

*Primary Examiner*—John S. Maples
*Assistant Examiner*—Richard Treanor
*Attorney, Agent, or Firm*—DePaoli & O'Brien

[57] ABSTRACT

This invention provides novel side chain polymers which exhibit nonlinear optical response, and which have utility as a transparent optical component in all-optical and electrooptical light switch and light modulator devices.

An invention side chain polymer is illustrated by the following structure:

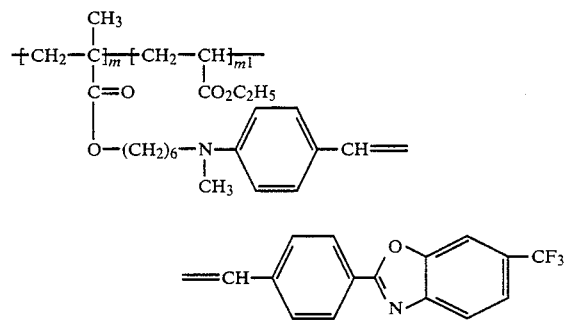

21 Claims, No Drawings

SIDE CHAIN POLYMERS EXHIBITING NONLINEAR OPTICAL RESPONSE

CROSS-REFERENCE TO RELATED PATENT APPLICATIONS

The present patent application has subject matter related to the disclosure of copending patent application Ser. No. 148,262, now U.S. Pat. No. 4,913,844 filed Jan. 25, 1988; patent application Ser. No. 156,051, now U.S. Pat. No. 4,826,950 filed Feb. 16, 1988; and patent application Ser. No. 405,503, filed Sept. 11, 1989.

BACKGROUND OF THE INVENTION

Polymers with a comb structure of pendant side chains are a new class of organic materials which exhibit unique optical properties.

Comb-like liquid crystalline polymers are described in Eur. Polym. J., 18, 651 (1982); Advanced Polymer Science, Liquid Crystal Polymers II/III, Springer-Verlag, New York (1984), pages 215–220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties. U.S. Pat. No. 4,792,208 discloses nonlinear optically responsive organic compounds and side chain polymers in which the molecular dipoles have an electron donor moiety linked through a conjugated $\pi$ bonding system to an electron acceptor sulfonyl moiety.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel optically responsive monomers and polymers.

It is another object of this invention to provide acrylic homopolymers and copolymers having side chains which exhibit nonlinear optical response.

It is a further object of this invention to provide optical light switch and light modulator devices with a transparent polymeric nonlinear optical component comprising a thin film of a polymer with nonlinear optically-responsive pendant side chains which can be uniaxially oriented by an external field.

Other objects and advantages of the present invention shall become apparent from the accompanying description and examples.

DESCRIPTION OF THE INVENTION

One or more objects of the present invention are accomplished by the provision of an amorphous polymer which is characterized by recurring monomeric units corresponding to the formula:

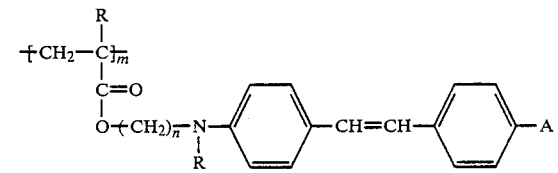

where R is hydrogen or a $C_1$–$C_4$ alkyl substituent; m is an integer of at least 5; n is an integer between about 1–20; and A is

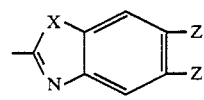

where X is —S—, —O— or —NR—; and Z is —H, —CN, —NO$_2$ or —CF$_3$.

In another embodiment this invention provides an amorphous acrylic copolymer which is characterized by recurring monomeric units corresponding to the formula:

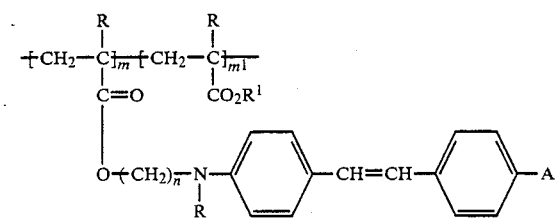

where R is hydrogen or a $C_1$–$C_4$ alkyl substituent; $R^1$ is a $C_1$–$C_6$ alkyl substituent; m and ml are integers which total at least 10; n is an integer between about 1–20; and A is

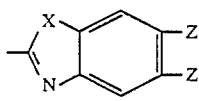

where X is —S—, —O— or —NR—; and Z is —H, —CN, —NO₂ or —CF₃.

A typical polymer of the present invention has a weight average molecular weight in the range between about 5000–200,000, and a glass transition temperature in the range between about 40°–150° C.

A present invention polymer has pendant side chains which exhibit nonlinear optical susceptibility $\beta$. A polymer can be formed into a nonlinear optical medium, such as a transparent film or coating on a substrate. A polymer can be applied to a supporting substrate by conventional means, such as spin coating, spraying, Langmuir-Blodgett deposition, and the like.

A film or coating fabricated with a present invention polymer exhibits third order nonlinear optical susceptibility $\chi^{(3)}$.

A nonlinear optical medium of the present invention can be subjected to an external field to uniaxially orient the polymer side chains. In one method the polymer medium is heated close to or above the polymer glass transition temperature $T_g$, then an external field (e.g., a DC electric field) is applied to the medium of mobile polymer molecules to induce uniaxial molecular alignment of the polymer side chains parallel to the applied field, and the medium is cooled while maintaining the external field effect.

By this method a present invention nonlinear optical medium has a stable uniaxial alignment of polymer side chains. The poled optical medium exhibits a second order nonlinear optical susceptibility $\chi^{(2)}$. A present invention poled optical medium is capable of exhibiting a $\chi^{(2)}$ level of $2 \times 10^{-8}$ esu or higher as measured at 1.34 μm excitation wavelength.

In another embodiment this invention provides an optical light switch or light modulator device which contains a polymeric nonlinear optical component comprising a transparent solid medium of an amorphous polymer which is characterized by recurring monomeric units corresponding to the formula:

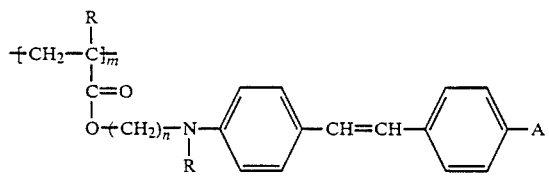

where R is hydrogen or a $C_1$–$C_4$ alkyl substituent; m is an integer of at least 5; n is an integer between about 1–20; and A is

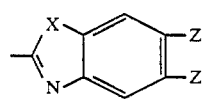

where X is —S—, —O— or —NR—; and Z is —H, —CN, —NO₂ or —CF₃.

In another embodiment this invention provides an optical light switch or light modulator device which contains a polymeric nonlinear optical component comprising a transparent solid medium of an amorphous acrylic copolymer which is characterized by recurring monomeric units corresponding to the formula:

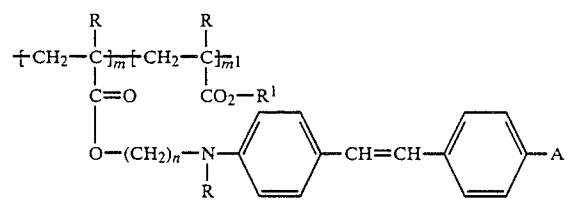

where R is hydrogen or a $C_1$–$C_4$ alkyl substituent; m and $m^1$ are integers which total at least 10; n is an integer between about 1–20; and A is

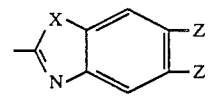

where X is —S—, —O— or —NR—; and Z is —H, —CN, —NO₂ or —CF₃.

In a present invention optical light switch or light modulator device, the polymeric nonlinear optical component exhibits less than about 10 percent scattering of transmitted incident light waves.

The term "transparent" as employed herein refers to a polymeric optical medium which is transparent or light transmitting with respect to incident fundamental and created light frequencies. In a present invention optical device, the polymeric thin film nonlinear optical medium component is transparent to both the incident and exit light frequencies.

The term "amorphous" as employed herein refers to a transparent polymeric optical medium which does not have a preferred short range molecular order that exhibits optical anisotropy.

The term "external field" as employed herein refers to an electric, magnetic or mechanical stress field which is applied to a substrate of mobile polymer molecules, to induce dipolar alignment of the polymer molecules parallel to the field.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as elaborated in U.S. Pat. No. 4,775,215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; AACS Symposium Series 233 (1983).

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371,220; 3,530,301; and 3,537,020.

A present invention optical device can be achieved by constructing one of the optical devices described in the technical literature, except that a present invention polymer medium is utilized as the nonlinear optical component.

SYNTHESIS OF MONOMERS AND POLYMERS

A. Heterocyclic Starting Materials

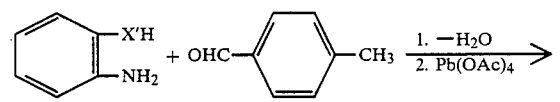

(2)

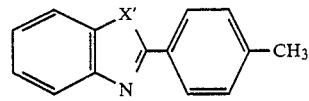

X' is —O— or —NR—.

B. Intermediate

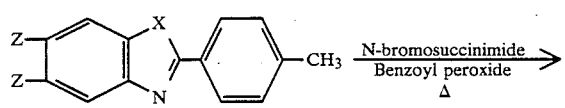

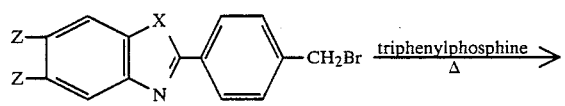

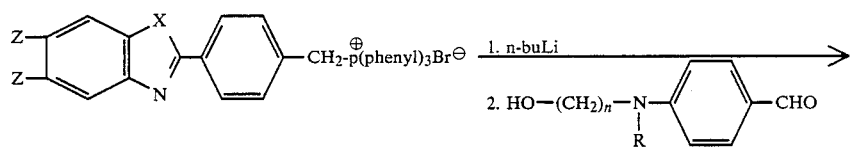

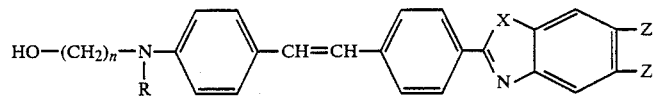

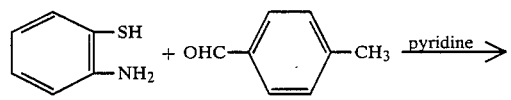

(1)

C. Monomer

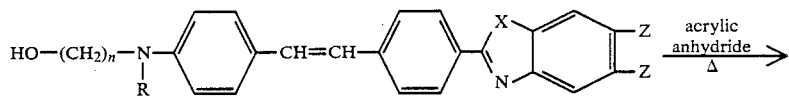

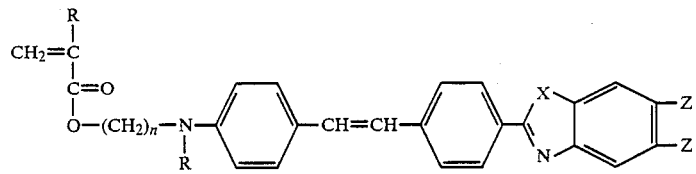

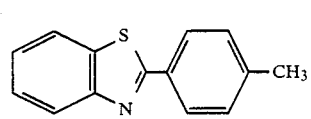

The substituent R is hydrogen or a $C_1$-$C_4$ alkyl group; X is —S—, —O— or —NR—, and Z is —H, —CN, —CN, —NO$_2$ or —CF$_3$.

D. Copolymer

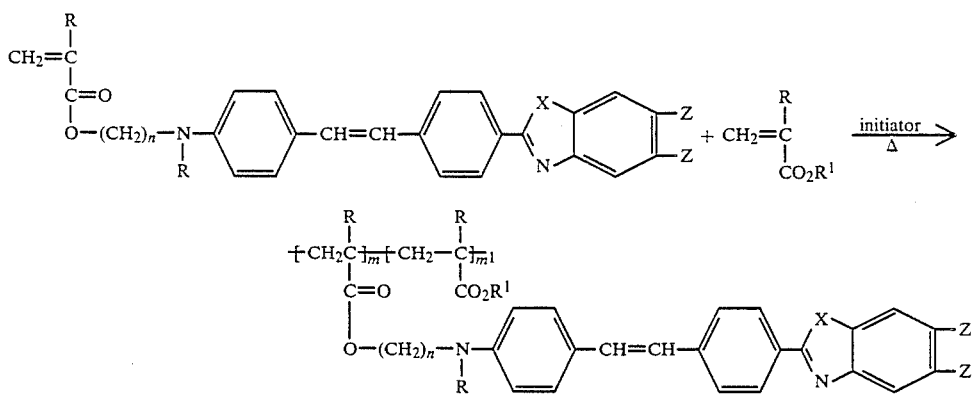

The substituent $R^1$ is a $C_1$–$C_6$ alkyl group.

E. General Procedures

All reactions are performed under an inert atmosphere, using oven-dried glassware and dry solvents.

1. Synthesis of benzthiazoles

To a stirred solution of 2-aminothiophenol (1 equiv) in pyridine is added dropwise the appropriately substituted benzaldehyde (1 equiv) in pyridine, and the reaction is heated at reflux for one hour. After cooling to room temperature, the reaction is acidified with cold 2N HCl, and the aqueous solution is extracted with methylene chloride. The solution is swirled with basic alumina, the solids removed by filtration, and the solvent evaporated. The product benzthiazole is recrystallized from absolute ethanol.

2. Synthesis of benzoxazoles and benzimidazoles

The appropriately substituted benzaldehyde (1 equiv) and 2-aminophenol or 1,2-phenylenediamine (1 equiv) are dissolved in toluene and the reaction is heated at reflux with azeotropic removal of water. After 20 hours at reflux, the reaction is cooled to room temperature, lead tetraacetate (1 equiv) is added, and the mixture is stirred overnight at room temperature. The solids are removed by filtration, and the filtrate is swirled with basic alumina. Removal of the solvent in vacuo affords the solid product which is then purified by recrystallization from benzene.

3. Synthesis of intermediates (a) 4-Methylphenyl-2-benzoxazole (1 equiv), N-bromosuccinimide (1 equiv), and benzoyl peroxide (2 mole %) are dissolved in carbon tetrachloride, and the reaction is heated at reflux for 20 hours. After cooling to room temperature, the reaction is diluted by the addition of carbon tetrachloride, and the solid by-products are removed by filtration. The filtrate is concentrated in vacuo, and the product is purified by recrystallization.

(b) The product from the first step (1 equiv) and triphenylphosphine (1.1 equiv) are dissolved in xylene, and the reaction is heated at reflux for 19 hours. The solid product is then isolated by filtration, washed with additional portions of xylene, and dried.

(c) To a stirred mixture of the product from the second step (2 equiv) in toluene is added dropwise n-BuLi (2 equiv) at room temperature. After 2 hours a solution of the 4-[N-(2-hydroxyethyl)-N-methylamino]benzaldehyde (1 equiv) in toluene is added dropwise to the mixture, and the reaction is stirred for 18 hours at room temperature. Water is added, and the solids are isolated by vacuum filtration, washed with 60% ethanol in water, and dried under vacuum. The product is purified by recrystallization.

4. Synthesis of monomers

The product from above (1 equiv) is dissolved in pyridine, and 4-N,N-dimethylaminopyridine (1 mole %) and methacrylic anhydride (2 equiv) are added with stirring. The reaction is heated at 80° C. until completion. After cooling to room temperature, the solution is poured into water, and the solid monomer is collected by filtration and purified by recrystallization.

5. Polymerization of monomers

The monomer or comonomers (if doing copolymerization, relative ratios of comonomers to be determined) are dissolved in a suitable solvent (10% solution by weight), and the solution is degassed for 15 minutes *AIBN (1 mole%) is added to the mixture, and the solution is degassed for an additional 15 minutes. The polymerization is then performed at 70° C. under argon overnight. After cooling to room temperature, the polymer is then precipitated into a nonsolvent and collected by filtration. Purification is achieved by redissolving the polymer in a suitable solvent such as tetrahydrofuran and precipitating it into a nonsolvent such as methanol.
*Azo-bis-isobutyronitrile The side chain polymers of the present invention have a unique combination of physical and optical properties. The side chain stilbene-type electronic system in conjugation electron-donating and electron-withdrawing substituents exhibits exceptional nonlinear optical susceptibility. The presence of a benzthiazole or benzoxazole or benzimidazole electron-withdrawing group in a present invention pendant side chain electronic system contributes additional advantages as compared to a nitro or cyano electron-withdrawing group. A benzimidazole-type structure is a stronger electron-withdrawing group than a nitro or cyano group, and contributes to a higher level of B susceptibility under nonlinear optically responsive conditions. A benzimidazole-type substituent also provides a stable uniaxial molecular orientation when the side chains in a polymeric film are poled with an external field.

A present invention polymer in the form of a waveguiding medium has particular advantage in comparison with a medium of a liquid crystalline side chain polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

The following examples are further illustrative of the present invention. The components and specific ingredients are presented as being typical, and various modifications can be derived in view of the foregoing disclosure within the scope of the invention.

EXAMPLE I

This Example illustrates the preparation of a homopolymer and copolymer (25/75) in accordance with the present invention.

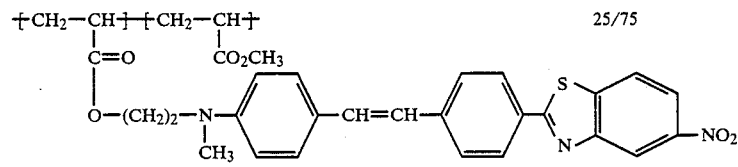

25/75

A. 4-(N-2-hydroxyethyl-N-methylamino)benzaldehyde

A three-neck flask fitted with a mechanical stirrer, a thermometer, and a condenser is charged with 124.1 g (1 mole) of 4-fluorobenzaldehyde, 75.1 g (1 mole) of 2-(N-2-(N-methylamino)ethanol, 138.2 g (1 mole) of anhydrous potassium carbonate, and dimethylsulfoxide. The mixture is heated at 95° C. for 3 hours. After cooling to room temperature, the solution is poured into a four-fold excess of ice water, and the solid product is collected by filtration and recrystallized from water.

B. 4-(N-2-acryloyloxyethyl-N-methylamino)benzaldehyde (compound A)

A solution of 161.3 g (0.9 mole) of 4-(N-2-hydroxyethyl-N-methylamino)benzaldehyde, 227.0 g (1.8 moles) of acrylic anhydride, and 1.1 g (1 mole%) of 4-N,N-dimethylaminopyridine in pyridine is heated at 80° C. until the reaction is complete. After cooling to room temperature, the solution is poured into water, and compound A is collected by filtration, and purified by recrystallization from ethanol.

C. 2-Amino-4-nitrothiophenol

To a stirred solution of 172.6 g (1 mole) of 2-chloro-5-nitroaniline in boiling ethanol/water (5:2) is added a solution of sodium sulfide (generated from sodium sulfide nonahydrate and sodium bicarbonate), and the reaction is heated at reflux for one hour. The mixture then is cooled in ice, and the resulting crystalline product is collected by filtration and recrystallized from water.

D. 2-(4-Methylphenyl)-5-nitrobenzthiazole

To a stirred solution of 153.2 g (0.9 mole) of 2-amino-4-nitrothiophenol in pyridine is added 108.1 g (0.9 mole) of 4-tolualdehyde, and the reaction is heated at 100° C. until the starting materials are consumed. After cooling to room temperature, the mixture is acidified with cold 2N HCl, and the intermediate benzthiazoline is collected by filtration. The benzthiazoline is dissolved in methanol, then ferric chloride is added, and the solution is warmed at 40° C. for about 2 hours until oxidation to the benzthiazole is complete. The product is recrystallized from ethanol.

E. 2-(4-Bromoethylphenyl)-5-nitrobenzthiazole

A stirred solution of 162.2 g (0.6 mole) of 2-(4-methylphenyl)-5-nitrobenzthiazole, 106.8 g (0.6 mole) of N-bromosuccinimide, and 2.9 g (2 mole %) of benzoyl peroxide in carbon tetrachloride is heated at reflux for 20 hours. After cooling to room temperature, the reaction is diluted by the addition of carbon tetrachloride, and the solid byproducts are removed by filtration. The filtrate is concentrated in vacuo, and the product is purified by recrystallization from ethanol.

F. 4-(5-Nitrobenzthiazol-2-yl)tolyltriphenylphosphonium bromide (Compound B)

A stirred solution of 104.7 g (0.3 mole) of 2-(4-bromomethylphenyl)-5-nitrobenzthiazole and 78.6 g (0.3 mole) of triphenylphosphine in xylene is heated at reflux for 19 hours. Compound B then is isolated by filtration, washed with additional portions of xylene, and dried.

G. Synthesis of acrylate monomer

To a stirred solution of 122.3 g (0.2 mole) of compound B in toluene is added dropwise 0.2 mole of n-BuLi at room temperature. After 2 hours a solution of 23.3 g (0.1 mole) of compound A is added dropwise to the mixture, and the reaction is stirred at room temperature for 18 hours. Water is added, and the monomer is isolated by filtration, washed with 60% ethanol/water, dried under vacuum, and purified by recrystallization from tetrahydrofuran.

H. Formation of the homopolymer

The acrylate monomer is dissolved in a dimethylformamide (10% solution by weight), and the solution is degassed with argon for 15 minutes. AIBN (1 mole %) is added to the solution, and the solution is degassed for an additional 15 minutes. The reaction is then heated at 70° C. under argon for about 20 hours. After cooling to room temperature, the polymer is precipitated into methanol and collected by filtration. Purification is achieved by redissolving the polymer in 1,2-dichloroethane and precipitating it into methanol.

I. Formation of 25:75 copolymer

The acrylate monomer (12.14 g, 0.025 mole) and methyl acrylate (6.46 g, 0.075 mole) are dissolved in trichloropropane solvent (10% solution by weight of solutes), and the solution is degassed for 15 minutes AIBN (1 mole %) is added to the mixture, and this solution is degassed for an additional 15 minutes. The reaction is then heated at 70° C. under argon for about 20 hours After cooling to room temperature, the polymer is precipitated into methanol and collected by filtration Purification is achieved by redissolving the polymer in trichloropropane and precipitating into tetrahydrofuran.

The polymer has a $T_g$ of about 149° C., and exhibits a $\beta$ of about $130\times10^{-30}$ esu as measured at 1.34 μm excitation wavelength.

Similar procedures are followed to produce homopolymers and copolymers with the same type of pendant side chain structures, except that the electron-withdrawing group on the benzthiazole radical is a cyano or trifluoromethyl substituent instead of a nitro substituent.

EXAMPLE II

This Example illustrates the preparation of a copolymer (50/50) in accordance with the present invention.

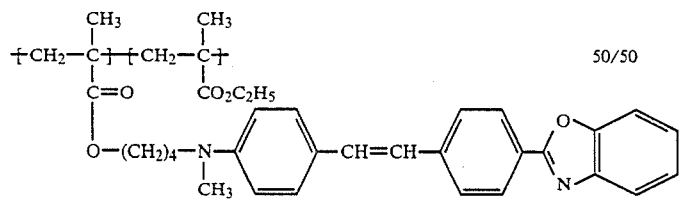

A. 4-(N-4-hydroxybutyl-N-methylamino)benzaldehyde

To a three-neck flask fitted with a mechanical stirrer, a thermometer, and a condenser is added 124.0 g (1 mole) of 4-fluorobenzaldehyde, 89.14 g (1 mole) of 4-amino-1-butanol, and 276.4 g (2 moles) of potassium carbonate, and dimethylsulfoxide The reaction mixture is then heated at 95° C. for about 3 hours until TLC indicates no more 4-fluorobenzaldehyde is present After cooling to room temperature, the solution is chilled to −10° C., and 141.9 g (1 mole) of iodomethane is added dropwise with stirring. After 2 hours at −10° C. the solution is poured into a four-fold excess (relative to dimethylsulfoxide) of ice water, and the solid product is collected by filtration and recrystallized from water.

B. 4-(N-hydroxybutyl-N-methylamino)benzaldehyde, methacrylate ester (Compound A)

To a stirred solution of 165.6 g (0.8 mole) of 4-(N-4-hydroxybutyl-N-methylamino)benzaldehyde in pyridine are added 0.98 g (1 mole %) of 4-N,N-dimethylaminopyridine and 277.5 g (1.6 moles) of methacrylic anhydride. The reaction is heated at 80° C. for two hours. After cooling to room temperature, the solution is poured into water, and compound A is collected by filtration and purified by recrystallization from ethanol.

C. 2-(4-Methylphenyl)benzoxazole

A solution of 120.2 g (1 mole) of 4-tolualdehyde and 109.1 g (1 mole) of 2-aminophenol in toluene is heated at reflux with azeotropic removal of water. After 20 hours at reflux, the reaction is cooled to room temperature, then 443.4 g (1 mole) of lead tetraacetate is added, and the mixture is stirred at room temperature for 20 hours. The solids are removed by filtration, and the filtrate is swirled with basic alumina. Removal of the solvent in vacuo affords the solid product which is then purified by recrystallization from ethanol.

D. 2-(4-Bromomethylphenyl)benzoxazole

A stirred solution of 188.1 g (0.9 mole) of 2-(4-methylphenyl)benzoxazole, 160.2 g (0.9 mole) of N-bromosuccinimide, and 4.4 g (2 mole %) of benzoyl peroxide in carbon tetrachloride is heated at reflux for 20 hours.

After cooling to room temperature, the reaction is diluted by the addition of carbon tetrachloride, and the solid byproducts are removed by filtration. The filtrate is concentrated in vacuo, and the product is purified by recrystallization from benzene.

E. 4-(Benzoxazol-2-yl)tolyltriphenylphosphonium bromide (Compound B)

A stirred solution of 172.7 g (0.6 mole) of 2-(4-bromomethylphenyl)benzoxazole and 157.4 g (0.6 mole) of triphenylphosphine in xylene is heated at reflux for 19 hours. The product is then isolated by filtration, washed with additional portions of xylene, and dried.

F. Synthesis of 4-(n-4-methacroyloxybutyl-N-methylamino)-4'-(benzoxazol-2-yl) stilbene (Compound C)

To a stirred solution of 275.1 g (0.5 mole) of compound B in toluene is added dropwise 0.5 mole of n-BuLi at room temperature. After 2 hours at room temperature a solution of 68.8 g (0.25 mole) of compound A in toluene is added dropwise to the mixture, and the reaction is stirred for 18 hours at room temperature. Water is added, and compound C is isolated by vacuum filtration, washed with 60% ethanol/water, dried under vacuum, and purified by recrystallization from 1,2-dichloroethane.

G. Formation of 50:50 copolymer

Compound C (46.6 g, 0.1 mole) and ethyl methacrylate (11.4 g, 0.1 mole) are dissolved in trichloropropane (10% solution by weight of solutes), and the solution is degassed for 15 minutes. AIBN (1 mole %) is added to the mixture, and the solution is degassed for an additional 15 minutes. The reaction is then heated at 70° C. under argon for 20 hours. After cooling to room temperature, the polymer is precipitated into ethanol and collected by filtration. Purification is achieved by redissolving the polymer in trichloropropane and precipitating it into tetrahydrofuran.

The polymer has a $T_g$ of about 152° C., and exhibits a $\beta$ of about $140\times10^{-30}$ esu as measured at 1.34 μm excitation wavelength.

Similar procedures are followed to produce homopolymers and copolymers in which the benzoxazole structure in the pendant side chains contains one or two nitro, cyano and/or trifluoromethyl substituents as electron-withdrawing groups.

EXAMPLE III

This Example illustrates the preparation of a copolymer (60/40) in accordance with the present invention.

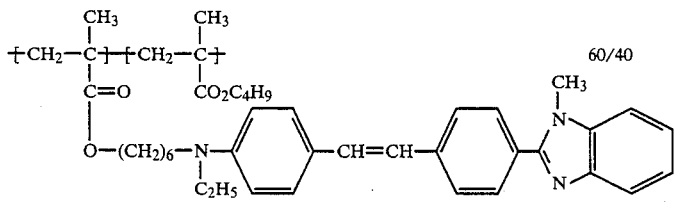

60/40

A. 4-(N-6-hydroxyhexyl-N-ethylamino)benzaldehyde

To a three-neck flask fitted with a mechanical stirrer, a thermometer, and a condenser is added 124.0 g (1 mole) of 4-fluorobenzaldehyde, 117.2 g (1 mole) of 6-amino-1-hexanol, 276.4 g (2 mole) of potassium carbonate, and dimethylsulfoxide. The reaction mixture is heated at 95° C. for about 3 hours until thin-layer chromatography indicates no more 4-fluorobenzaldehyde is present After cooling to room temperature, 156 g (1 mole) of ethyl iodide is added dropwise, and the reaction is stirred at room temperature for 5 hours The solution is poured into a four-fold excess of ice water, and the solid product is collected by filtration and purified by recrystallization from water.

B. 4-(N-6-hydroxyhexyl-N-ethylamino)benzaldehyde, methacrylate ester (Compound A)

To a stirred solution of 149.4 g (0.6 mole) of 4-(N-6-hydroxyhexyl-N-ethylamino)benzaldehyde in pyridine is added 0.73 g (1 mole %) of 4-N,N-dimethylaminopyridine and 185 g (1.2 mole) of methacrylic anhydride. The reaction is heated at 80° C. for three hours. After cooling to room temperature, the solution is poured into water, and compound A is collected by filtration and purified by recrystallization from ethanol.

C. 2-(4-methylphenyl)benzimidazole

A solution of 120.2 g (1 mole) of 4-tolualdehyde and 108.1 g (1 mole) of o-phenylenediamine in toluene is heated at reflux with azeotropic removal of water. After 20 hours at reflux, the reaction is cooled to room temperature, then 443.4 g (1 mole) of lead tetraacetate is added, and the reaction is stirred at room temperature for 20 hours The solids are removed by filtration, and the filtrate is swirled with basic alumina. The mixture is filtered, and the filtrate is evaporated to dryness The product is purified by recrystallization from ethanol.

D. 1-Trifluoroacetyl-2-(4-methylphenyl)benzimidazole

To a solution of 166.6 g (0.8 mole) of 2-(4-methylphenyl)benzimidazole in anhydrous ether is added 847.9 g (8 mole) of sodium carbonate. The mixture is cooled to 0° C., and 1.68 kg (8 mole) of trifluoroacetic anhydride is added. After addition is complete, and the reaction mixture is stirred for 20 minutes at room temperature, the mixture is poured into rapidly stirred ice water to destroy the excess anhydride, and the layers are separated. The aqueous portion is extracted with ether, and the combined organics are washed with water, dried over 4A sieves, and evaporated. The crude product is purified by recrystallization from ethanol.

E. 1-Trifluoroacetyl-2-(4-bromomethylphenyl)benzimidazole

A stirred solution of 213.0 g (0.7 mole) of 1-trifluoroacetyl-2-(4-methylphenyl)benzimidazole, 125.0 g (0.7 mole) of N-bromosuccinimide, and 3.39 g (2 mole %) of benzoyl peroxide in carbon tetrachloride is heated at reflux for 20 hours. After cooling to room temperature, the reaction is diluted by the addition of carbon tetrachloride, and the solid byproducts are removed by filtration. The filtrate is concentrated in vacuo, and the product is purified by recrystallization from tetrahydrofuran.

F. 2-(4-Bromomethylphenyl)benzimidazole

1-Trifluoroacetyl-2-(4-bromomethylphenyl)benzimidazole (229.9 g, 0.6 mole) is stirred for 5 hours at room temperature in a 7% solution of potassium carbonate in aqueous methanol The methanolic solution is evaporated to near dryness, and the aqueous residue is extracted with methylene chloride. The combined organics are washed with water, filtered through cotton, and evaporated to yield a solid product which is purified by recrystallization from benzene.

G. 1-Methyl-2-(4-bromomethylphenyl)benzimidazole

To a stirred solution of 143.6 g (0.5 mole) of 2-(4-bromomethylphenyl)benzimidazole and 42.0 g (0.5 mole) of sodium bicarbonate in 85% aqueous acetone is added 66.0 g (0.5 mole) of dimethylsulfate dropwise. The mixture is stirred at 40° C. for about 3 hours until thin-layer chromatography indicates that the reaction is complete. The solvent is removed in vacuo, and the solid product is washed with water to eliminate sodium salts and purified by recrystallization from benzene.

H. 4-(1-Methylbenzimidazol-2-yl)tolyltriphenylphosphonium bromide (Compound B).

A stirred solution of 90.4 g (0.3 mole) of 1-methyl-2-(4-bromomethylphenyl)benzimidazole and 78.7 g (0.3 mole) of triphenylphosphine in xylene is heated at reflux for 19 hours. Compound B is then isolated by filtration, washed with additional portions of xylene, and dried.

I. Synthesis of 4-(N-6-methacroyloxyhexyl-N-ethylamino)-4'-(1-methylbenzimidazol-2-yl)stilbene (Compound C)

To a stirred solution of 112.7 g (0.2 mole) of compound B in toluene is added dropwise 0.2 mole of n-BuLi at room temperature. After 2 hours at room temperature a solution of 31.7 g (0.1 mole) of compound A in toluene is added dropwise to the mixture, and the reaction is stirred for 18 hours at room temperature. Water is added, and compound C is isolated by vacuum filtration, washed with 60% ethanol/water, dried under vacuum, and purified by recrystallization from 1,2-dichloroethane.

Formation of 60:40 copolymer

Compound C (31.3 g, 0.06 mole) and butyl methacrylate (5.7 g, 0.04 mole) are dissolved in a suitable solvent (10% solution by weight of solutes), and the solution is degassed for 15 minutes. AIBN (1 mole %) is added to the mixture, and this solution is degassed for an additional 15 minutes. The polymerization reaction is conducted at 70° C. under argon for 20 hours. After cooling to room temperature, the polymer is precipitated into methanol and collected by filtration. Purification is achieved by redissolving the polymer in trichloropropane and precipitating it into tetrahydrofuran.

The polymer has a $T_g$ of about 145° C., and exhibits a $\beta$ of about $123 \times 10^{-30}$ esu as measured at 1.34 μm excitation wavelength.

Similar procedures are followed to produce homopolymers and copolymers in which the benzimidazole structure in the pendant side chains contains one or two nitro, cyano and/or trifluoromethyl substituents as electron-withdrawing groups.

EXAMPLE IV

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system A 0.1 μm layer of 99.999% purity aluminum is deposited on the wafer.

AZ-1518 positive photoresist (Hoechst) is spin-coated on the aluminum-coated wafer with a Solitec model 5100 coater A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm²).

The mask is removed, and a thin piece of silicon (1 cm×2 cm) is placed on the surface of the patterned photoresist as a protective shield, and the combination is exposed to 70 mJ/cm² of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of the Example II copolymer (50/50) of side chain monomer/ethyl methacrylate in trichloropropane. The organic layer is dried in a vacuum oven at 160° C. for one hours.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 m coating of aluminum is deposited as an electrode layer on the upper cladding layer.

The fabricated waveguide is placed in a Mettler hot stage, and the unit is raised to 90° C. at 1° C./min. A DC field of 70V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $5 \times 10^8$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5–1% amount of the fundamental beam is converted into an observed second harmonic radiation.

What is claimed is:

1. An amorphous polymer which is characterized by recurring monomeric units corresponding to the formula:

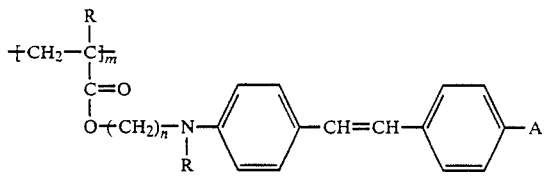

where R is hydrogen or a $C_1$–$C_4$ alkyl substituent; m is an integer of 5; n is an integer between about 1–20; and A is

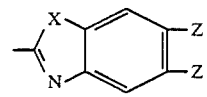

where X is —S—, —O— or —NR—; and Z is, independently, —H, —CN, —NO₂ or —CF₃.

2. A polymer in accordance with claim 1 which has a weight average molecular weight in the range between about 5000–200,000.

3. A polymer in accordance with claim 1 which has a glass transition temperature in the range between about 40°–150° C.

4. An amorphous acrylic copolymer which is characterized by recurring monomeric units corresponding to the formula:

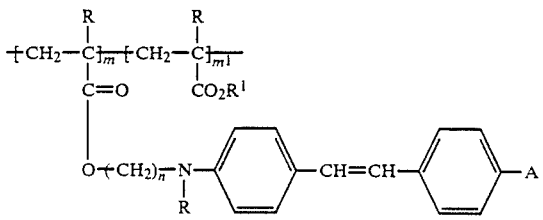

where R is hydrogen or a $C_1$–$C_4$ alkyl substituent; $R^1$ is a $C_1$–$C_6$ alkyl substituent; m and $m^1$ are integers which total at least 10; n is an integer between about 1–20; and A is

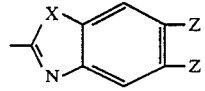

where X is —S—, —O— or —NR—; and Z is, independently, —H, —CN, —$NO_2$ or —$CF_3$.

5. An acrylic copolymer in accordance with claim 4 which has a weight average molecular weight in the range between about 5000–200,000.

6. An acrylic copolymer in accordance with claim 4 which has a glass transition temperature in the range between about 40°–150° C.

7. A nonlinear optical medium consisting of a transparent film of an amorphous polymer which is characterized by recurring monomeric units corresponding to the formula:

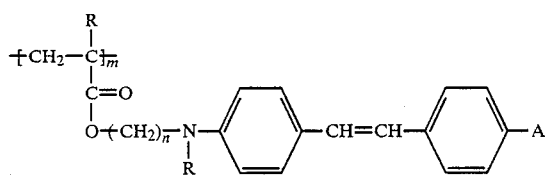

where R is hydrogen or a $C_1$–$C_4$ alkyl substituent; m is an integer of at least 5; n is an integer between about 1–20; and A is

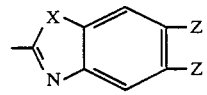

where X is —S——O— or —NR—; and Z is, independently, —H, —CN, —$NO_2$ or —$CF_3$.

8. A nonlinear optical medium in accordance with claim 7 which is characterized by an external field-induced orientation of aligned polymer side chains, and which exhibits second order nonlinear optical susceptibility $\chi^{(2)}$.

9. A nonlinear optical medium consisting of a transparent film of an amorphous acrylic copolymer which is characterized by recurring monomeric units corresponding to the formula:

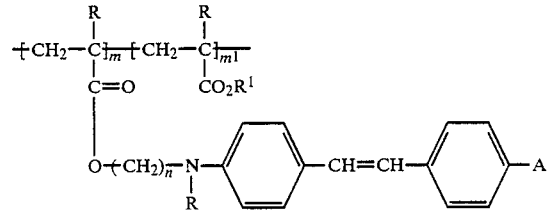

where R is hydrogen or a $C_1$–$C_4$ alkyl substituent; $R$ is a $C_1$–$C_6$ alkyl substituent; m and $m^1$ are integers which total at least 10; n is an integer between about 1–20; and A is

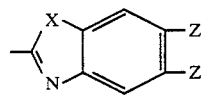

where X is —S—, —O— or —NR—; and Z is, independently, —H, —CN, —$NO_2$ or —$CF_3$.

10. A nonlinear optical medium in accordance with claim 9 which is characterized by an external field-induced orientation of aligned polymer side chains, and which exhibits second order nonlinear optical susceptibility $\chi^{(2)}$.

11. In an optical light switch or light modulator device the improvement which comprises a polymeric nonlinear optical component comprising a transparent solid medium of an amorphous polymer which is characterized by recurring monomeric units corresponding to the formula:

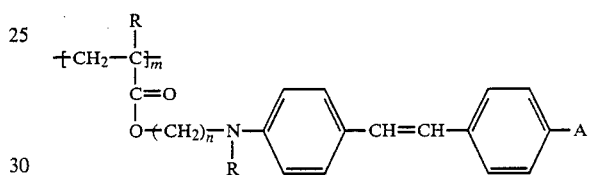

where R is hydrogen or a $C_1$–$C_4$ alkyl substituent; m is an integer of at least 5; n is an integer between about 1–20; and A is

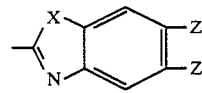

where X is —S—, —O— or —NR—; and Z is, independently, —H, —CN, —$NO_2$ or —$CF_3$.

12. An optical device in accordance with claim 11 wherein the polymer medium exhibits third order nonlinear optical susceptibility $\chi^{(3)}$.

13. An optical device in accordance with claim 11 wherein the polymer medium has a stable orientation of an external field-induced alignment of polymer side chains, and the medium exhibits second order nonlinear optical susceptibility $\chi^{(2)}$.

14. An optical device in accordance with claim 11 wherein the polymeric nonlinear optical component exhibits less than about 10 percent scattering of transmitted incident light.

15. An optical device in accordance with claim 11 which is adapted to double the frequency of an incident laser beam.

16. In an optical light switch or light modulator device the improvement which comprises a polymeric nonlinear optical waveguide component comprising a transparent solid medium of an amorphous acrylic copolymer which is characterized by recurring monomeric units corresponding to the formula:

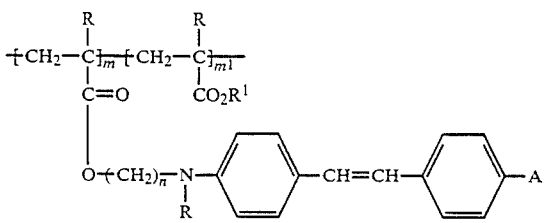

where R is hydrogen or a $C_1$–$C_4$ alkyl substituent; $R^1$ is a $C_1$–$C_6$ alkyl substituent; m and m1 are integers which total at least 10; n is an integer between about 1–20; and A is

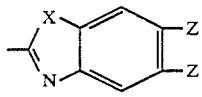

where X is —S—, —O— or —NR—; and Z is, independently, —H, —CN, —$NO_2$ or —$CF_3$.

17. An optical device in accordance with claim 16 wherein the polymer medium exhibits third order nonlinear optical susceptibility $\chi^{(3)}$.

18. An optical device in accordance with claim 16 wherein the polymer medium has a stable orientation of an external field-induced alignment of polymer side chains, and the medium exhibits second order nonlinear optical susceptibility $\chi^{(2)}$.

19. An optical device in accordance with claim 16 wherein the polymeric nonlinear optical component exhibits less than about 10 percent scattering of transmitted incident light.

20. An optical device in accordance with claim 16 which is adapted to double the frequency of an incident laser beam.

21. An acrylic monomer corresponding to the formula:

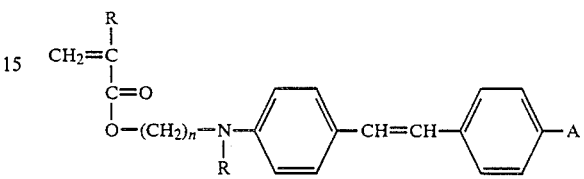

where R is hydrogen or a $C_1$–$C_4$ alkyl substituent; n is an integer between about 1–20; and A is

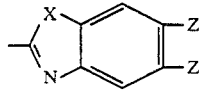

where X is —S—, —O— or —NR—; and Z is, independently, —H, —CN, —$NO_2$ or —$CF_3$.

* * * * *